United States Patent [19]
Arisato et al.

[11] Patent Number: 5,468,136
[45] Date of Patent: Nov. 21, 1995

[54] CLAMPING APPARATUS

[75] Inventors: Akira Arisato; Keitaro Yonezawa, both of Kobe, Japan

[73] Assignee: Kabushiki Kaisha Kosmek, Japan

[21] Appl. No.: 282,544

[22] Filed: Jul. 29, 1994

[30] Foreign Application Priority Data

Jul. 30, 1993 [JP] Japan ................................ 5-208549

[51] Int. Cl.$^6$ .................................................. B29C 33/30
[52] U.S. Cl. ........................................ 425/192 R; 425/195
[58] Field of Search ............................ 425/183, 192 R, 425/195, 451.9

[56] References Cited

U.S. PATENT DOCUMENTS

| | | | |
|---|---|---|---|
| 4,790,739 | 12/1988 | Manfredi | 425/192 R |
| 4,959,002 | 9/1990 | Pleasant | 425/192 R |
| 4,964,792 | 10/1990 | Katayama et al. | 425/451.9 |

FOREIGN PATENT DOCUMENTS

| | | |
|---|---|---|
| 49-36057 | 10/1974 | Japan . |
| 5-277585 | 10/1993 | Japan . |

Primary Examiner—James P. Mackey
Attorney, Agent, or Firm—Bacon & Thomas

[57] ABSTRACT

A clamp rod (20) is inserted into a through hole (2) of a base (1). The rod (20) is provided with a first external thread (21) adapted to engage with a clamping internal thread (11a) of a metal mold (11) and a second external thread (22) adapted to engage with a raising and lowering internal thread (12a). When the metal mold (11) is fixedly secured to the base (1), the rod (20) is rotated by an impact wrench (28). Thereupon, the rod (20) is screwed downward along the raising and lowering internal thread (12a) and then along the clamping internal thread (11a). Thereby, the base (1) is pressed downward by a pressing portion (23) of the rod (20).

8 Claims, 12 Drawing Sheets

CLAMPING APPARATUS

BACKGROUND OF THE INVENTION

1. Field of the Invention

The present invention relates to a clamping apparatus of the screw engaging type, and more specifically to a clamping apparatus of the type adapted to fixedly secure a metal mold and the like to a base by screwing and threadably engaging an external thread of a clamp rod with an internal thread formed in the metal mold and the like.

2. Description of Prior Art

As such apparatus there has been known the one, for example as disclosed in the Japanese Utility Model Publication No. 49-36057.

In this apparatus, while a connecting internal thread is formed in a member to be fixed such as a metal mold, a raising and lowering internal thread is formed in a base. A clamp rod is threadably engaged over both these internal threads and adapted to be rotated by an electric motor fixed to the base.

There are, however, following problems associated with the above-mentioned conventional apparatus.

Although the member to be fixed and the base are connected by the clamp rod, since a screw clearance exists between the connecting internal thread of the member to be fixed and the external thread of the rod and a screw clearance exists also between the raising and lowering internal thread of the base and the external thread of the rod, the force which pulls the member to be fixed and the base against each other can be hardly produced between them. Therefore, that conventional clamping apparatus should be called a coupling apparatus rather than the clamping apparatus.

Further, due to the error occuring when the member to be fixed is placed onto the base, an axis of the connecting internal thread and an axis of the raising and lowering internal thread happen to be misaligned. In this case, since the external thread of the clamp rod can not be engaged readily with the connecting internal thread, these threads would be damaged by a forcible engagement.

SUMMARY OF THE INVENTION

It is an object of the present invention to provide a clamping apparatus which is capable of exerting a large clamping force.

It is another object of the present invention to prevent a damage of a clamping apparatus which might be caused by an axis misalignment.

For accomplishing the above-mentioned objects, a clamping apparatus of the screw engaging type is constituted as follows, for example as illustrated in FIGS. 1 through 4, in FIGS. 5 and 6, in FIGS. 7 through 9, in FIGS. 10 through 3, in FIG. 14, in FIG. 15 or in FIG. 16 respectively.

A through hole 2 is formed in a base 1, a first internally threaded member 11 is arranged to face one end side of the through hole 2, a second internally threaded member 12 is supported on the other end side of the through hole 2 by the base 1, and a clamp rod 20 is inserted into the hole 2 with an alignment clearance C provided therebetween. The clamp rod 20 is provided with a first external thread 21 adapted to engage with the first internally threaded member 11, a second external thread 22 adapted to engage with the second internally threaded member 12, a pressing portion 23 adapted to press the base 1 from the other end side of the through hole 2 and a portion 24 adapted to be rotated by a rotating means 28 supported by the base 1.

The present invention functions as follows, for example as shown in FIG. 1.

Under the illustrated clamped condition, the clamp rod 20 has been rotated clockwise by an output portion 30 of the rotating means 28 so that the first external thread 21 of the clamp rod 20 has been screwed into a clamping internal thread 11a of the first internally threaded member 11. By the thread engagement force between both these threads 11a, 21 the first internally threaded member 11 is pulled up through the rod 20, and the downward reaction force acting on the rod 20 is received by an upper surface of the base 1 through the pressing portion 23. Thereby, the first internally threaded member 11 can be strongly secured to a lower surface of the base 1.

When the clamped condition is cancelled, the clamp rod 20 is rotated counterclockwise by the rotating means 28. Thereupon, the rod 20 is raised relative to the first internally threaded member 11. Subsequently thereto, the rod 20 is raised relative to the second internally threaded member 12, so that a lower end of the rod 20 is retracted into the through hole 2. The first internally threaded member 11 is brought out under this condition.

When changing over from the unclamped condition to the illustrated clamped condition, the clamp rod 20 is rotated clockwise by the rotating means 28. Thereupon, firstly the rod 20 is screwed downward relative to the second internally threaded member 12, and subsequently the first external thread 21 of the rod 20 is engaged with the clamping internal thread 11a of the first internally threaded member 11.

In case that an axis of the through hole 2 and an axis of the clamping internal thread 11a are offset each other due to an erroneous placement of the first internally threaded member 11 relative to the base 1 at the time of commencement of the engagement, the clamp rod 20 is operated as follows. For example, since a radial fitting clearance exists between the rotated portion 24 of the rod 20 and the output portion 30 of the rotating means 28, the rod 20 within the through hole 2 is shifted radially by an engaging resistance which is produced by the axis misalignment. Thereby, the axis misalignment is corrected automatically, so that the engagement between the first external thread 21 and the clamping internal thread 11a can be carried out smoothly.

Since the present invention is constituted and functions as mentioned above, the following advantages can be obtained.

Since the base is provided with both the through hole and the second internally threaded member as well as the clamp rod is provided with the pressing portion, it becomes possible to receive the screwing movements of the first external thread of the rod and of the clamping first internal thread of the first internally threaded member by the pressing portion. Thereby, a screw clearance between the first external thread and the clamping internal thread can be removed to securely obtain a large clamping force.

Further, even in case that the axis of the through hole and the axis of the clamping internal thread are offset each other, since there is provided the alignment clearance between the through hole and the clamp rod, it becomes possible to automatically correct the axis misalingment between the rod and the clamping internal thread. Therefore, it is possible to prevent an erroneous engagement between the first external thread of the rod and the clamping internal thread to prevent a damage of the clamping apparatus.

BRIEF DESCRIPTION OF THE DRAWINGS

FIG. 1 is a schematic view of a clamping apparatus;

FIG. 2 is an explanatory view of an operation of the clamping apparatus;

FIG. 3 is a sectional view taken along the III—III directed line in FIG. 2;

FIG. 4 is an enlarged view of a portion indicated by the arrow IV in FIG. 2;

FIG. 5 is a view corresponding to FIG. 2;

FIG. 6 is a view showing a halfway state of an operation of a clamping apparatus;

FIG. 7 is a view corresponding to FIG. 2;

FIG. 8 is a sectional view taken along the VIII—VIII directed line in FIG. 7:

FIG. 10 is a view corresponding to FIG. 2;

FIG. 11 is a sectional view taken along the XI—XI directed line in FIG. 10;

FIG. 12 is a vertical sectional partial view;

FIG. 13 is a horizontal sectional partial view in FIG. 12;

FIG. 14 shows a fifth embodiment of the present invention;

DESCRIPTION OF THE PREFERRED EMBODIMENTS

First Embodiment

FIGS. 1 through 4 show a first embodiment of the present invention.

Figure 1:
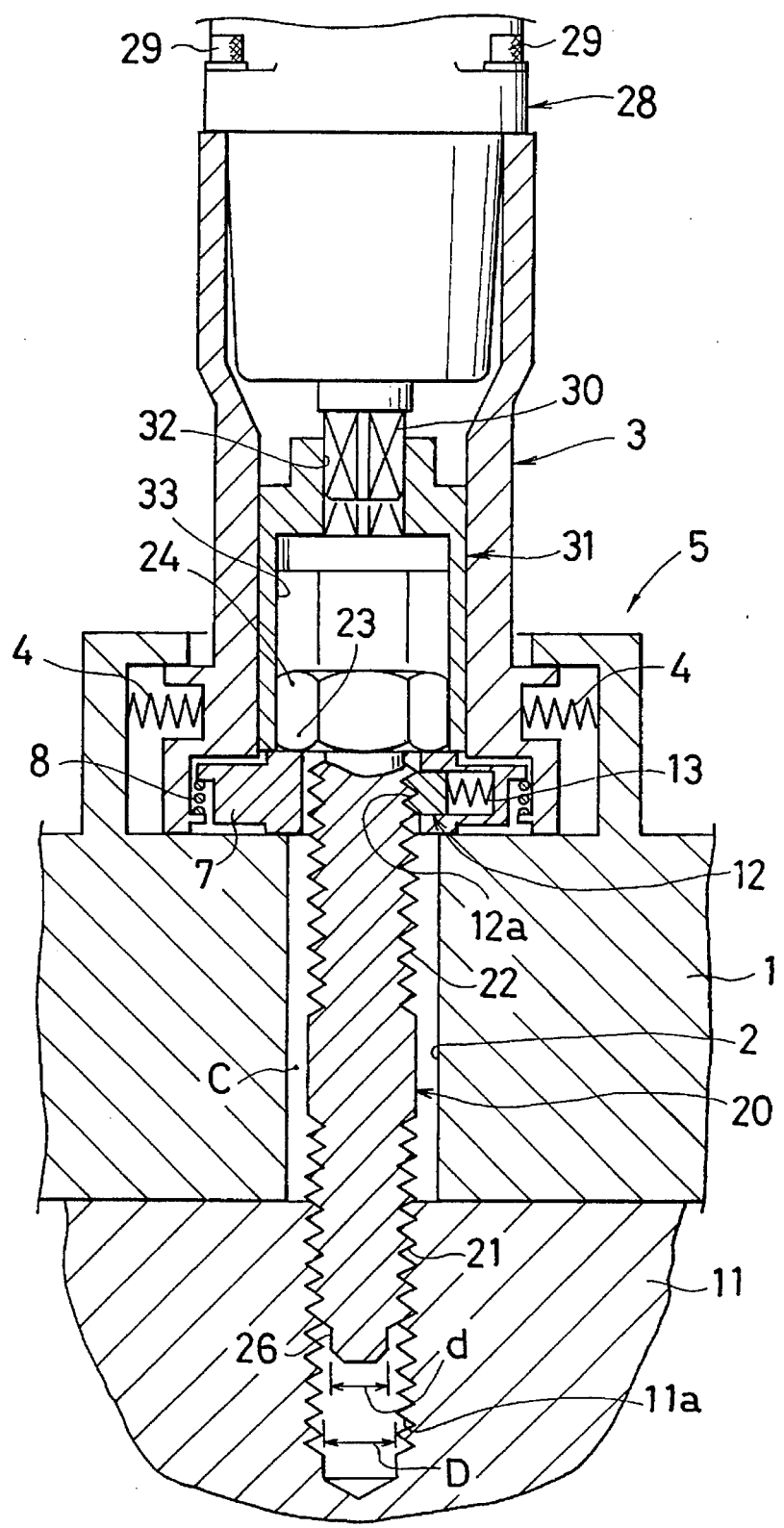
FIGS. 1 through 4 show a first embodiment of the present invention.

Firstly, with reference to a schematic view of FIG. 1, a principal section of a clamping apparatus will be explained hereinafter.

A base 1 has a through hole 2 so formed as to extend vertically therein. A clamping cylindrical housing 3 is supported by the upper surface of the base 1 so as to be not rotatable but to be slidable horizontally and is resiliently urged toward its axis by a plurality of springs 4. These plural springs 4 constitute a portion of an axis-shift allowing mechanism 5 which will be described later. A press ring 7 is inserted into a lower portion of the housing 3 so as to be not rotatable and the ring 7 is resiliently urged upward by springs 8.

A metal mold 11 as a first internally threaded member is so disposed as to be in contact with the lower surface of the base 1. A clamping internal thread 11a formed in the metal mold 11 is faced to a lower end of the through hole 2 from below. A second internally threaded member 12 is so supported within the press ring 7 as to be movable radially and is resiliently urged radially inward by a spring 13. A raising and lowering internal thread 12a is formed in the second internally threaded member 12.

A clamp rod 20 is inserted into the ring 7 and also into the through hole 2 with an alignment clearance C provided therebetween. The clamp rod 20 is provided with a first external thread 21, a second external thread 22, a pressing portion 23 and a rotated portion 24 in order from below. The first external thread 21 is adapted to engage with the clamping internal thread 11a of the metal mold 11. A tapered lead portion 26 is provided at a leading end of the first external thread 21. An outer diameter d of the lead portion 26 is set to a smaller value than a minor diameter D of the internal thread 11a. The second external thread 22 is adapted to engage with the raising and lowering internal thread 12a of the second internally threaded member 12.

A pneumatic impact wrench 28 as a rotating means is fixedly secured at an upper portion of the housing 3 by a plurality of bolts 20. This impact wrench 28 serves to tighten the clamping rod 20 by impacts produced from a pressurized air. Between an output portion 30 of the impact wrench 28 and the rotated portion 24 there is provided a socket 31 as a transmission cylinder. A square hole 32 formed in the upper portion of the socket 31 is adapted to so engage with the output portion 30 as to be capable of transmitting the rotating force and to be vertically movable. The rotated portion 24 is adapted to so engage with a lower hexagonal hole 33 of the socket 31 as to be capable of transmitting the rotating force and to be vertically movable.

Under the illustrated clamped condition, the socket 31 is rotated clockwise in a plan view by the output portion 30 of the impact wrench 28, so that the first external thread 21 of the clamp rod 20 is screwed into the clamping internal thread 11a. The metal mold 11 is pulled up by the screw engaging force acting between both these threads 11a, 21 through the rod 20, and the downward reaction force acting on the rod 20 is received by the upper surface of the base 1 through the pressing portion 23 and the press ring 7 in order. Thereby, the metal mold 11 is fixedly secured to the lower surface of the base 1.

Figure 2:
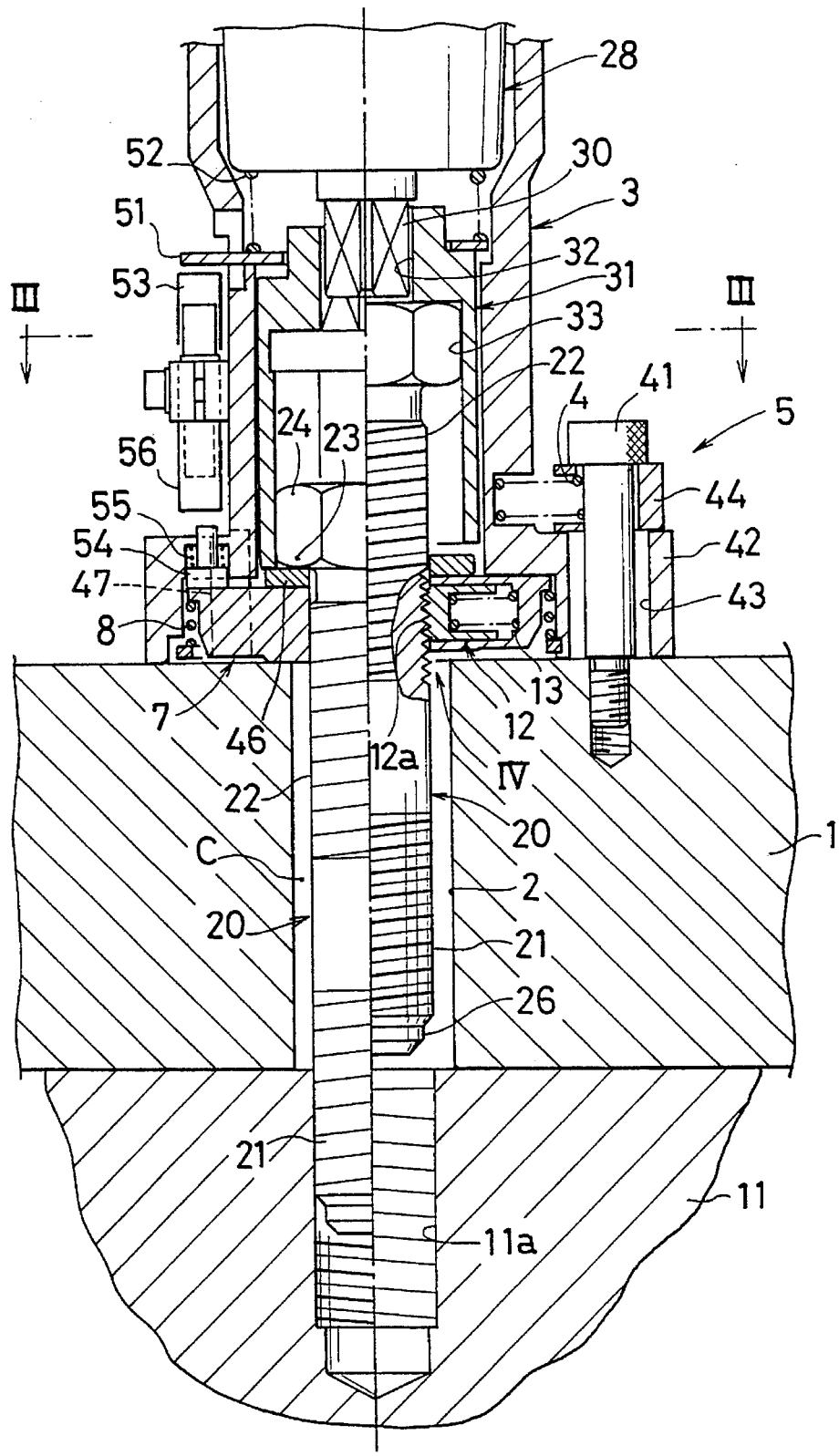
Figure 3:
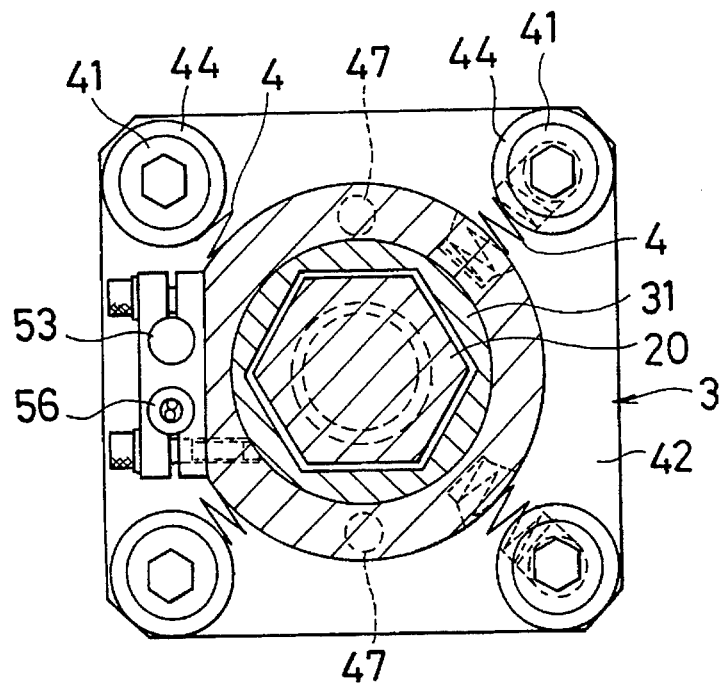
Figure 4:
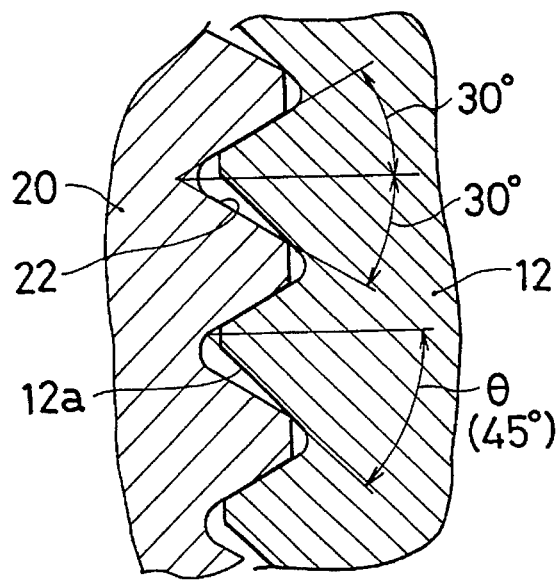

A concrete constitution or the clamping apparatus will be explained with reference to FIGS. 2 through 4. FIG. 2 is an explanatory view of an operation of the clamping apparatus with its right half view showing the unclamped condition and its left half view showing the clamped condition. FIG. 3 is a sectional view taken along the III—III directed line in FIG. 2. FIG. 4 is an enlarged view of a section indicated by the arrow IV in FIG. 2.

The axis-shift allowing mechanism 5 is constituted as follows.

Four stud bolts 41 are projected from the upper surface of the base 1. Four loose openings 43 are formed in a flange 42 of the housing 3 so that the bolts 41 can be inserted into the respective loose openings 43. The springs 4 are mounted between spring retainers 44 fitted to the respective bolts 41 and the housing 3. Between the spring retainer 44 and the flange 42 there is provided a slide gap.

A thrust ring 46 is interposed between the pressing portion 23 of the clamp rod 20 and the press ring 7. The wearing of the pressing portion 23 can be prevented by this ring 46. The turning of the press ring 7 is stopped by two pins 47 fixed to the flange 42.

As shown in FIG. 4 an included angle of the second external thread 22 (and the first external thread 21) of the clamp rod 20 is set to 60 degree. and an included angle of the raising and lowering internal thread 12a of the second internally threaded member 12 is set to 75 degree (30 degree +45 degree).

Mainly as shown in FIG. 2 the clamping apparatus operates as follows.

Under the unclamped condition as shown in the right half view, the socket 31 is rotated counterclockwise in the plan view by the output portion 30 of the pneumatic impact wrench 28. Thereby, the clamp rod 20 is raised relative to the second internally threaded member 12 and then the lead portion 26 of the clamp rod 20 is retracted into the through hole 2 of the base 1.

At the same time, the rotated portion 24 of the rod 20 raises an arm 51 through the socket 31 against a spring 52. When one proximity switch 53 detects the rise of the arm 51, an air supply to the impact wrench 28 is stopped after the lapse of a predetermined time (several seconds). Since there is provided a contact gap between the arm 51 and the socket 31 (refer to the left half view), only a short time is required for the rotating contact of the socket 31 with the arm 51 near to the upper limit of the socket 31 to decrease a slip friction between both these arm 51 and socket 31.

Under the unclamped condition as shown in the right half view, the metal mold 11 is brought below the base 1 so that the clamping internal thread 11a is arranged to face the through hole 2. When changing over from the unclamped condition to the clamped condition as shown in the left half view, the clamp rod 20 is rotated clockwise by the impact wrench 28. Firstly the rod 20 is screwed downward relative to the second internally threaded member 12, and then the first external thread 21 of the rod 20 is threadably engaged with the internal thread 11a.

Thereupon, the metal mold 11 is pulled up by the screw engaging force between both these threads 11a, 21 through the rod 20, and the downward reaction force acting on the rod 20 is received by the upper surface of the base 1 through the pressing portion 23, the thrust ring 46 and the press ring 7 in order. Thereby, the metal mold 11 can be fixedly secured to the lower surface of the base 1.

At the same time, a rod 54 supported by the upper surface of the press ring 7 is lowered by a spring 55. When the other proximity switch 56 detects the lowering of the rod 54, the air supply to the impact wrench 28 is stopped after the lapse of a predetermined time (several seconds).

When the first external thread 21 of the rod 20 is engaged with the clamping internal thread 11a, the lead portion 26 of the rod 20 at its leading end is inserted into the opening of the internal thread 11a. Thereupon, since the rod 20 takes a substantially upright posture, the first external thread 21 can be engaged with the internal thread 11a smoothly.

In case that pitches of both those threads 11a, 21 are out of phase, namely offset vertically to each other due to their vertical dimensional errors and so on at the time of commencement of the screw engagement, since a screw thrust acts from the second external thread 22 to the raising and lowering internal thread 12a of the second internally threaded member 12 due to a resistance produced by that offset, the second internally threaded member 12 moves radially outward against the spring 13 to automatically make the pitches of both those threads 11a, 21 coincident with each other. Thereby, the first external thread 21 can be engaged with the internal thread 11a smoothly.

Incidentally, an angle θ indicated at 45 degree in FIG. 4 may be set within a range of 30 degree to 60 degree. But as the angle θ is set to a larger value, the movement for correcting that offset becomes smoother.

Further, in case that the axis of the clamping internal thread 11a is offset from the axis of the through hole 2 due to placement errors and so on of the metal mold 11, the housing 3 is moved toward the radial direction of the internal thread 11a against the spring 4 by the resistance generated when the lead portion 26 or the first external thread 21 starts to be inserted into the internal thread 11a. Thereby, the first external thread 21 can be engaged with the internal thread 11a smoothly.

Incidentally, in case that an offset between those axes is excessively large or the internal thread 11a is damaged, since the screw engagement between both these threads 11a, 21 becomes impossible, the lowering of the clamp rod 20 is blocked. However, since the second internally threaded member 12 is moved radially outward against the spring 13 along with the rotation of the second external thread 22 of the rod 20 so that the rod 20 can rotate idly, damages of the component members can be prevented. In this case, since the other proximity switch 56 doesn't detect the clamped condition, the clamping is judged to be a misoperation and then an air supply to the impact wrench 28 is stopped automatically after the lapse of a predetermined time.

Under the clamped condition as shown in the left half view, when the rod 20 is rotated counterclockwise by the impact wrench 28, the rod 20 is raised by the engagement between the clamping internal thread 11a and the first external thread 21. After the engagement between both those threads 11a and 21 has been cancelled, the rod 20 is further raised by the engagement between the raising and lowering internal thread 12a and the second external thread 22. Thereby, the unclamped condition as shown in the right half view can be obtained.

As mentioned above, since the socket 31 is interposed between the output portion 30 of the impact wrench 28 and the rotated portion 24 of the clamp rod 20 to allow the rod 20 to rise and lower within the socket 31, the height of the housing 3 can be made low.

Since the rod 20 can have both the first external thread 21 and the second external thread 22 formed in the same profile, commercially available bolts can be utilized to decrease the manufacturing cost.

Incidentally, instead of the axis-shift allowing mechanism 5, the axis-shift may be allowed by a fitting gap between the output portion 30 of the impact wrench 28 and the square hole 32 of the socket 31.

The output portion 30 of the impact wrench 28 may be so formed as to fit externally to the upper portion of the socket 31 instead of the internal fitting.

FIGS. 5 through 16 show a second embodiment through a seventh embodiment, and only such constitutions different from those of the first embodiment will be explained hereinafter. Incidentally, in these embodiments, component members having the same constitutions as those in the first embodiment are designated, in principle, by the same symbols.

Second Embodiment

Figure 5:
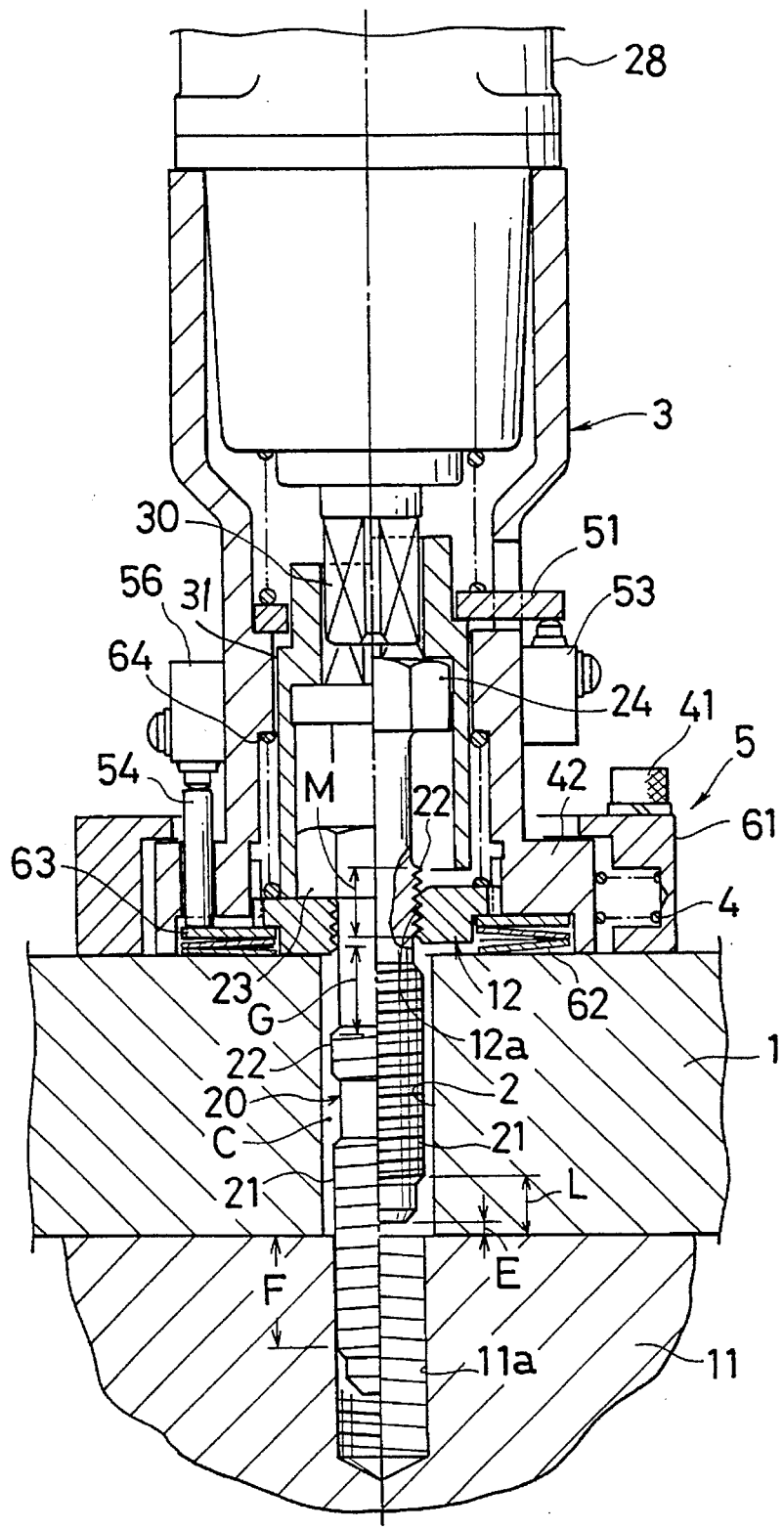
FIGS. 5 and 6 show a second embodiment of the present invention.
Figure 6:
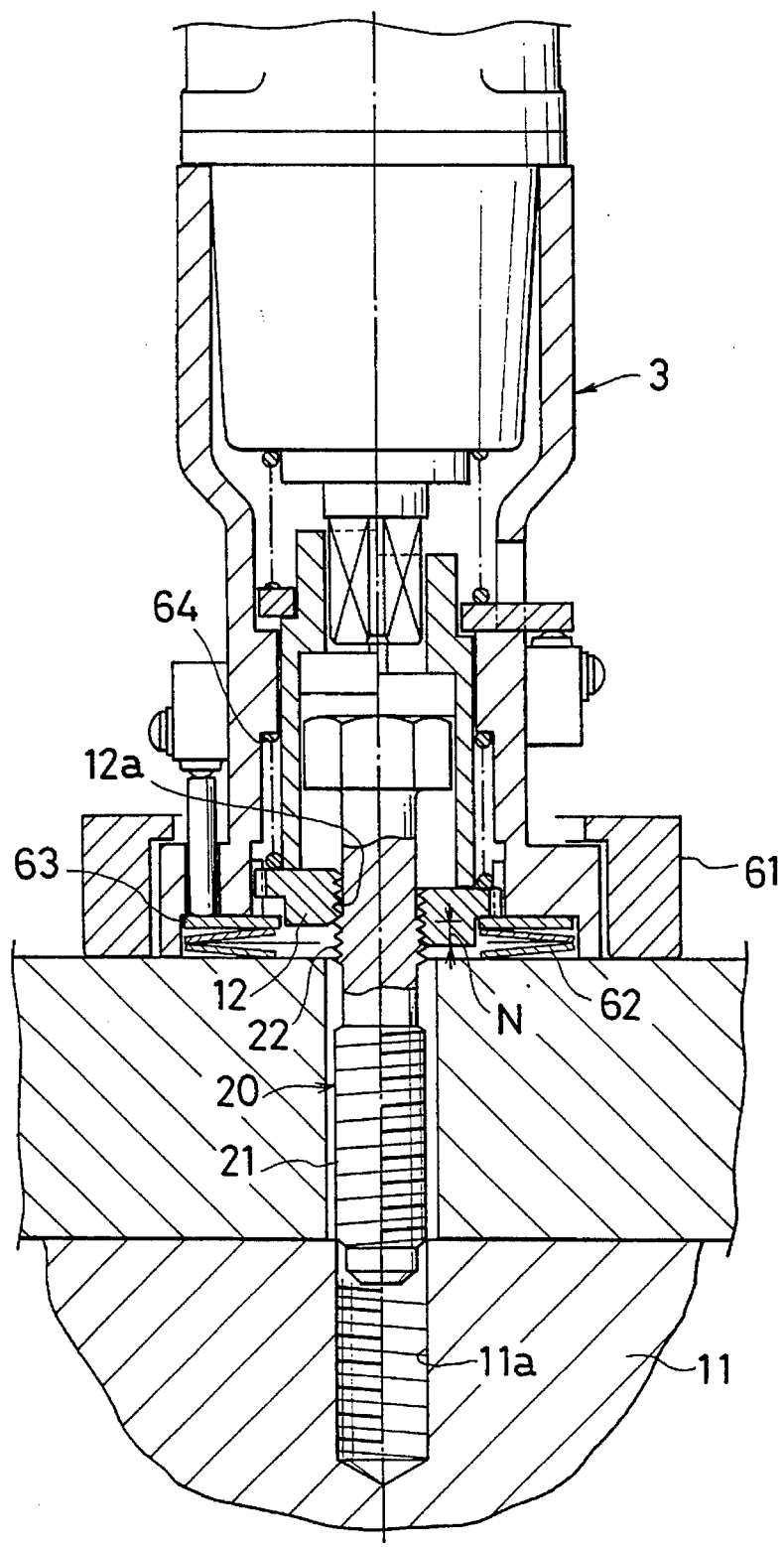

FIGS. 5 and 6 show the second embodiment. FIG. 5 is a view corresponding to FIG. 2 and FIG. 6 is a view showing a halfway condition of the clamping operation.

The axis-shift allowing mechanism 5 is constituted as follows. A support cylinder 61 is fixedly secured onto the base 1 by the plurality of bolts 41, and the flange 42 of the housing 3 is resiliently urged toward its axis by the plurality of springs 4 retained by the support cylinder 61.

The two detection switches 53, 56 are composed of limit switches. The second internally threaded member 12 is formed in an annular configuration and interposed between the pressing portion 23 of the rod 20 and the base 1. The internally threaded member 12 is resiliently urged upward by two strong coned disc springs 62 through a switch actuation plate 63 and also resiliently urged downward by a weak coil spring 64.

The clamp rod 20 is constituted as follows. A length F of the engagement range between the first external thread 21 and the clamping internal thread 11a is set to a larger value than an engagement preparation length G of the second external thread 22. An engagement length M of the second external thread 22 relative to the second internally threaded member 12 is set to a larger value than an engagement preparation length L of the first external thread 21 by an overlap engagement length N (refer to FIG. 6).

The above-mentioned clamping apparatus operates as follows.

Under the unclamped condition as shown in the right half view of FIG. 5, the clamp rod 20 has been raised relative to the second internally threaded member 12, and the lower end of the rod 20 has been raised from the lower surface of the base 1 by a retracting length E.

Under the unclamped condition, when the clamp rod 20 is rotated clockwise by the impact wrench 28, the rod 20 is screwed downward relative to the second internally threaded member 12. Thereupon, firstly, as shown in the right half view of FIG. 6, the lower end of the first external thread 21 is brought into contact with the clamping internal thread 11a. Under this condition, since the second external thread 22 and the raising and lowering internal thread 12a of the second internally threaded member 12 are engaged with each other along the overlap length N. Therefore, the rod 20 is further lowered so that the first external thread 21 is screwed downward and engaged with the internal thread 11a. Thereby, the rod 20 is changed over to the clamped condition as shown in the left half view of FIG. 5.

In the right half view of FIG. 6, in case that the first external thread 21 becomes incapable of engaging with the internal thread 11a due to a damage of the internal thread 11a, as shown in the left half view of FIG. 6 the second internally threaded member 12 is raised by the overlap engagement length N against the coil spring 64 and then the engagement between the raising and lowering internal thread 12a and the second external thread 22 can be cancelled. Thereby, the rod 20 is rotated idly.

Under the clamped condition as shown in the left half view of FIG. 5, when the rod 20 is rotated counterclockwise by the impact wrench 28, the first external thread 21 rises relative to the internal thread 11a and then the second external thread 22 engages with the raising and lowering internal thread 12a at the end of its rising. Subsequently, the rod 20 is raised by the screw engagement between both these threads 22, 12a. Thereby, the unclamped condition as shown in FIG. 5 can be obtained.

Incidentally, in case that the pitches of both the second external thread 22 and the raising and lowering internal thread 12a are out of phase at the time of commencement of their engagements, the second internal thread member 12 is raised against the coil spring 64 by the resistance at the time of engagement so as to take the same phase automatically. Therefore, the screw engagement can be performed smoothly.

Third Embodiment

Figure 7:
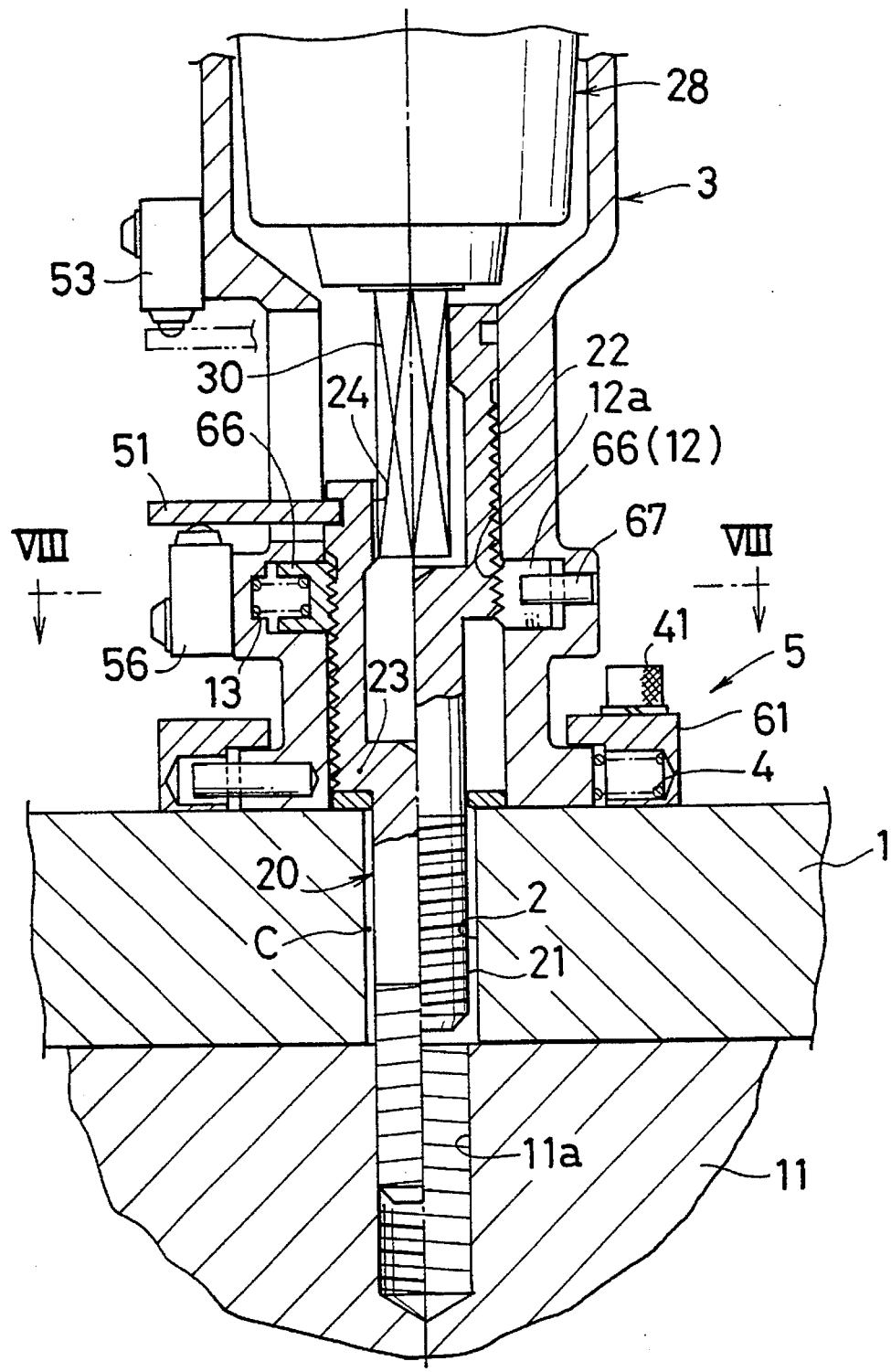
FIGS. 7 and 8 show a third embodiment of the present invention.
Figure 8:
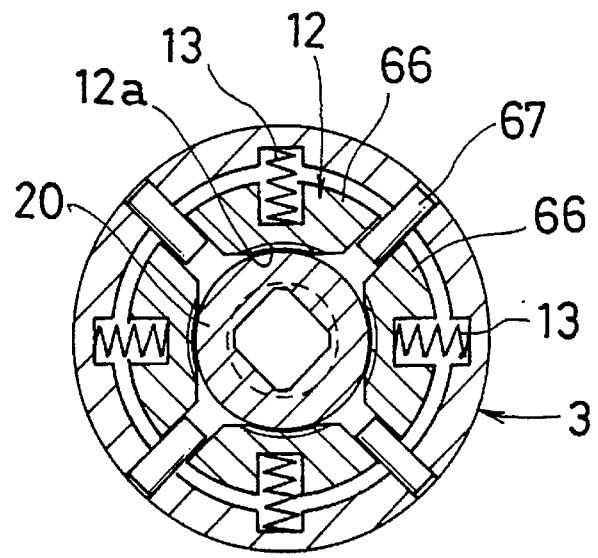

FIGS. 7 and 8 show the third embodiment.

The axis-shift allowing mechanism 5 is constituted similarly to that of the second embodiment and has the support cylinder 61 fixedly secured to the base I by the plurality of bolts 41. The second internally threaded member 12 comprises four segments 66. These segments 66 are guided radially by four stopper pins 67 respectively. Each segment 66 has the raising and lowering internal thread 12a formed in its inner peripheral surface. The rotated portion 24 of the clamp rod 20 is formed by a square hole and directly coupled to the output portion 30 of the impact wrench 28. The two limit switches 53, 56 are adapted to be actuated by an arm 51 fixed to the upper portion of the rod 20.

Figure 9:
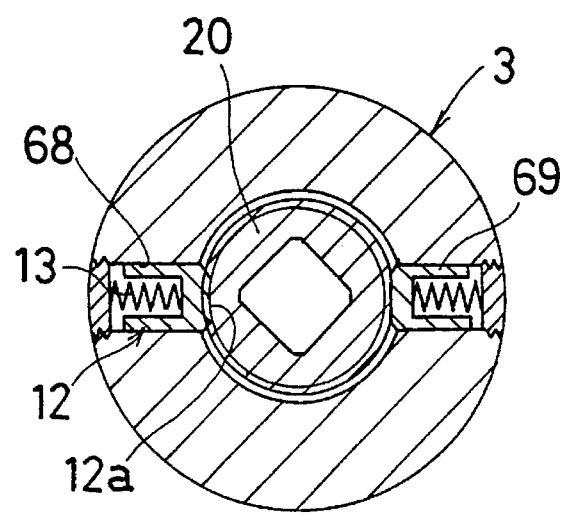
FIG. 9 shows a variant example of the third embodiment and is a view corresponding to FIG. 8.

FIG. 9 show a variant example and is a view corresponding to FIG. 8. Only one second internally threaded member 12 is provided so as to be guided by a guide hole 68 of the housing 3. The symbol 12a designates the raising and lowering internal thread, and the symbol 69 does a balancing push pin. Instead of this pin 69, the same one as the second internally threaded member 12 may be provided. Further, the pin 69 may be omitted.

Fourth Embodiment

Figure 10:
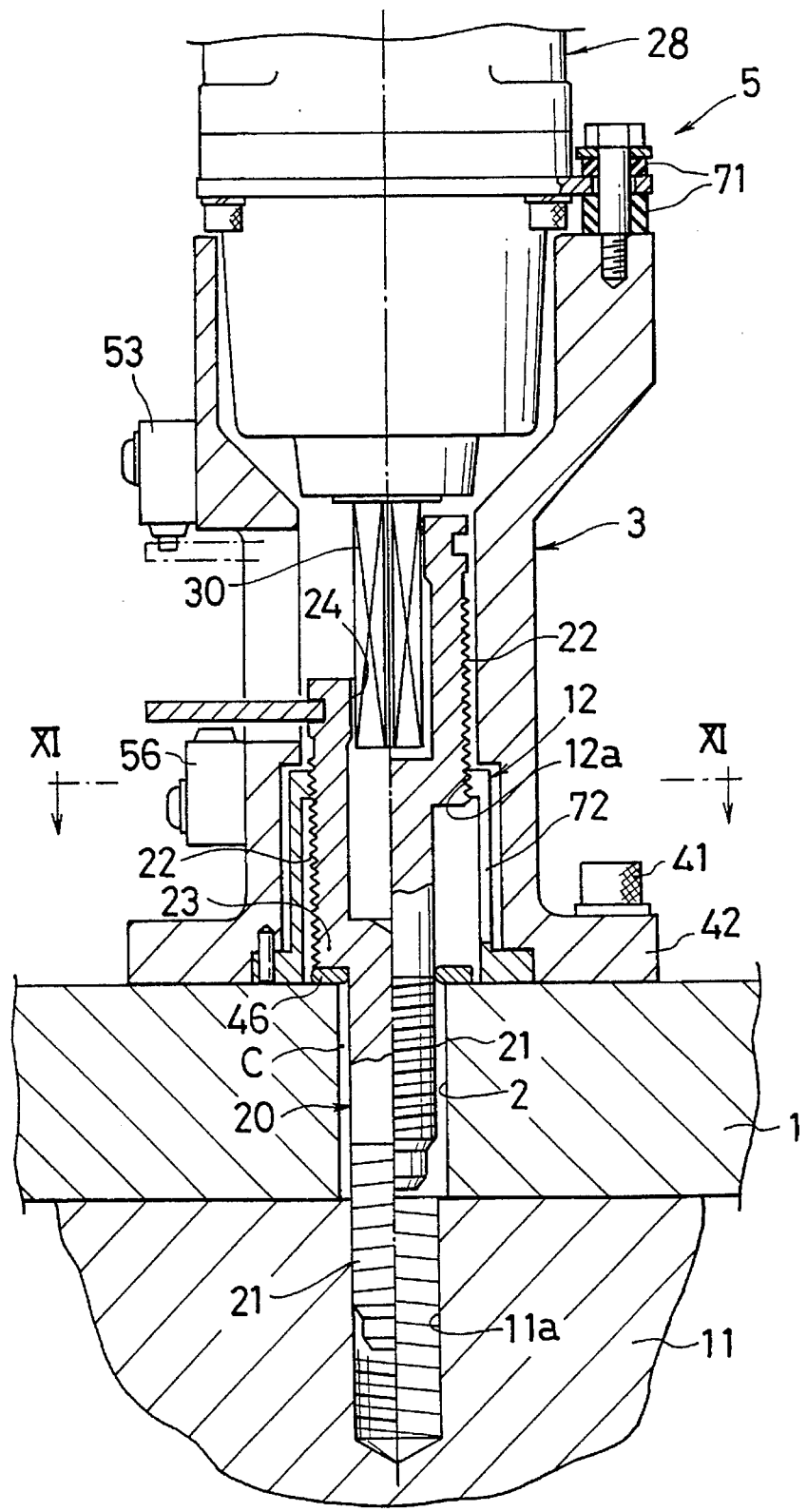
FIGS. 10 and 11 show a fourth embodiment of the present invention.
Figure 11:
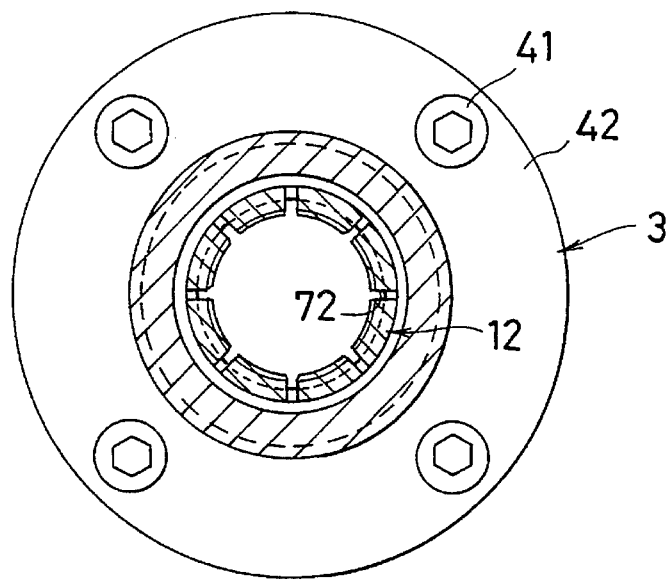

FIGS. 10 and 11 show the fourth embodiment.

The flange 42 of the housing 3 is fixedly secured to the base 1 by the plurality of bolts 41. The axis-shift allowing mechanism 5 comprises support rubbers 71 disposed at a plurality of locations along the peripheral direction between the upper portion of housing 3 and the impact wrench 28 and a fitting gap between the rotated portion 24 and the output portion 30. The second internally threaded member 12 is formed in the cylindrical configuration, and while its lower portion is fixedly pressed by the housing 3, the raising and lowering internal thread 12a is formed in its upper portion. The internal thread 12a is adapted to resiliently deform radially through a plurality of slits 72 extending vertically.

Figure 13:
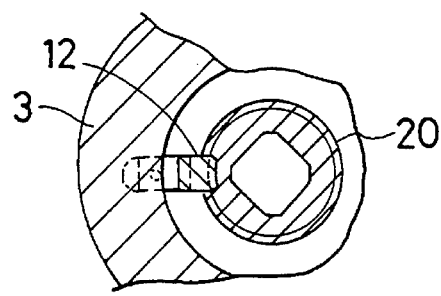
FIGS. 12 and 13 show variant examples of the fourth embodiment.
Figure 12:
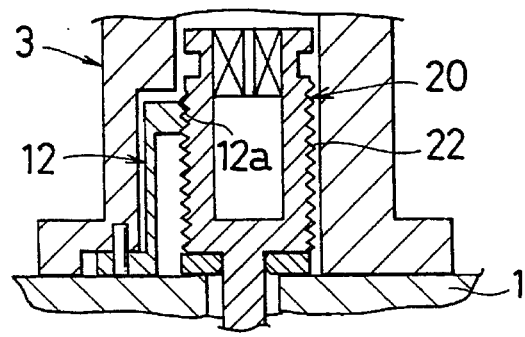

FIGS. 12 and 13 show a variant example. The second internally threaded member 12 is constituted only by divided pieces of cylindrical body.

Fifth Embodiment

FIG. 14 shows the fifth embodiment.

The second internally threaded member 12 is constituted by a cylindrical rigid body. The second internally threaded member 12 is so supported by the housing 3 as to be vertically movable through a spline mechanism 75 and is resiliently urged downward by a spring 74.

Figure 14B:
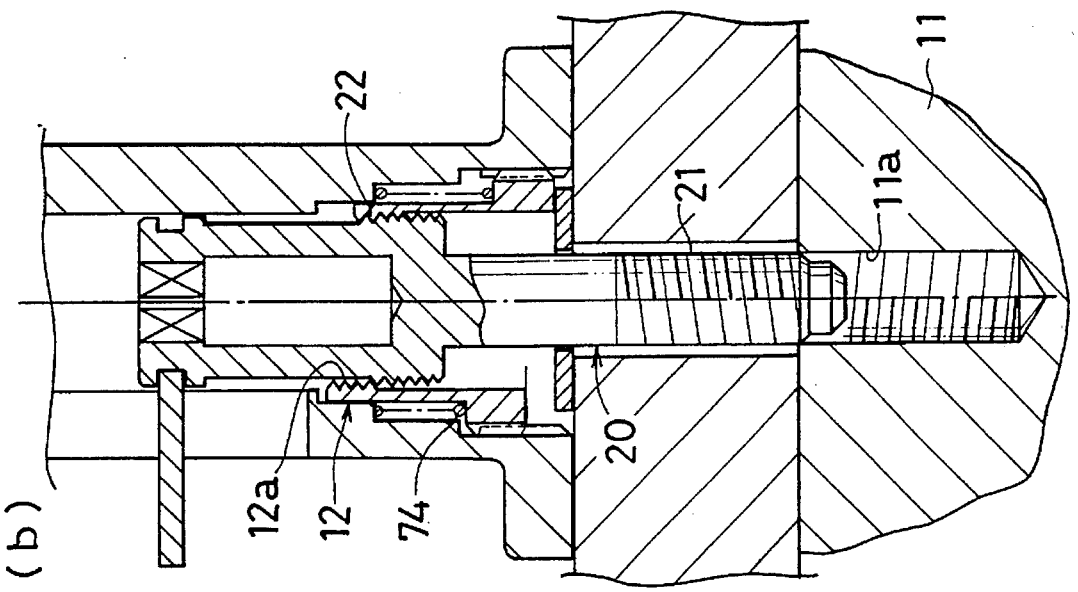
FIG. 14(b) is a view corresponding to FIG. 6.
Figure 14A:
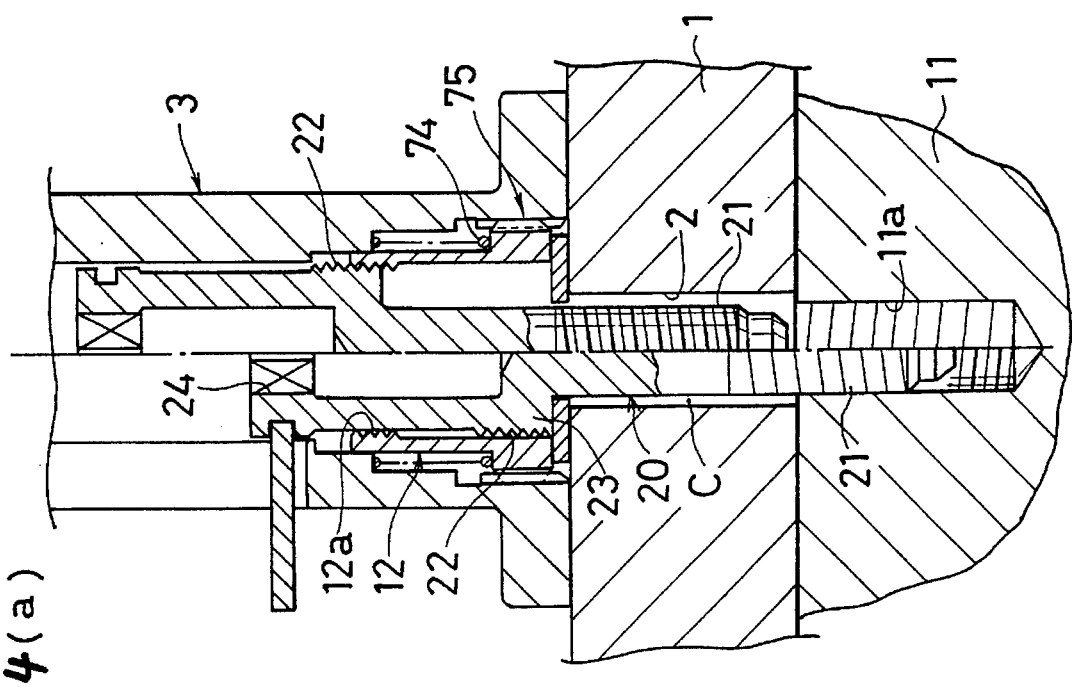
FIG. 14(a) is a view corresponding to FIG. 2.

Under the unclamped condition as shown in the right half view of FIG. 14(a), the raising and lowering internal thread 12a of the second internally threaded member 12 has been engaged with the second external thread 22. Under the clamped condition as shown in the left half view of FIG. 14(a), the engagement between both these threads 12a, 22 has been cancelled.

The right half view of FIG. 14(b) shows engagement commencement states of the clamping internal thread 11a and the first external thread 21. In case that both those threads 11a, 21 become incapable of engaging with each other due to a profile damage of the internal thread 11a and the like, as shown in the left half view of FIG. 14(b), the second internally threaded member 12 is raised against the spring 74. Thereby, the engagement between the raising and lowering internal thread 12a and the second external thread 22 can be cancelled.

In this embodiment, the pitches of the first external thread 21 and the second external thread 22 are preferably the same for the sake of manufacturing, but they may be different from each other.

Sixth Embodiment

Figure 15:
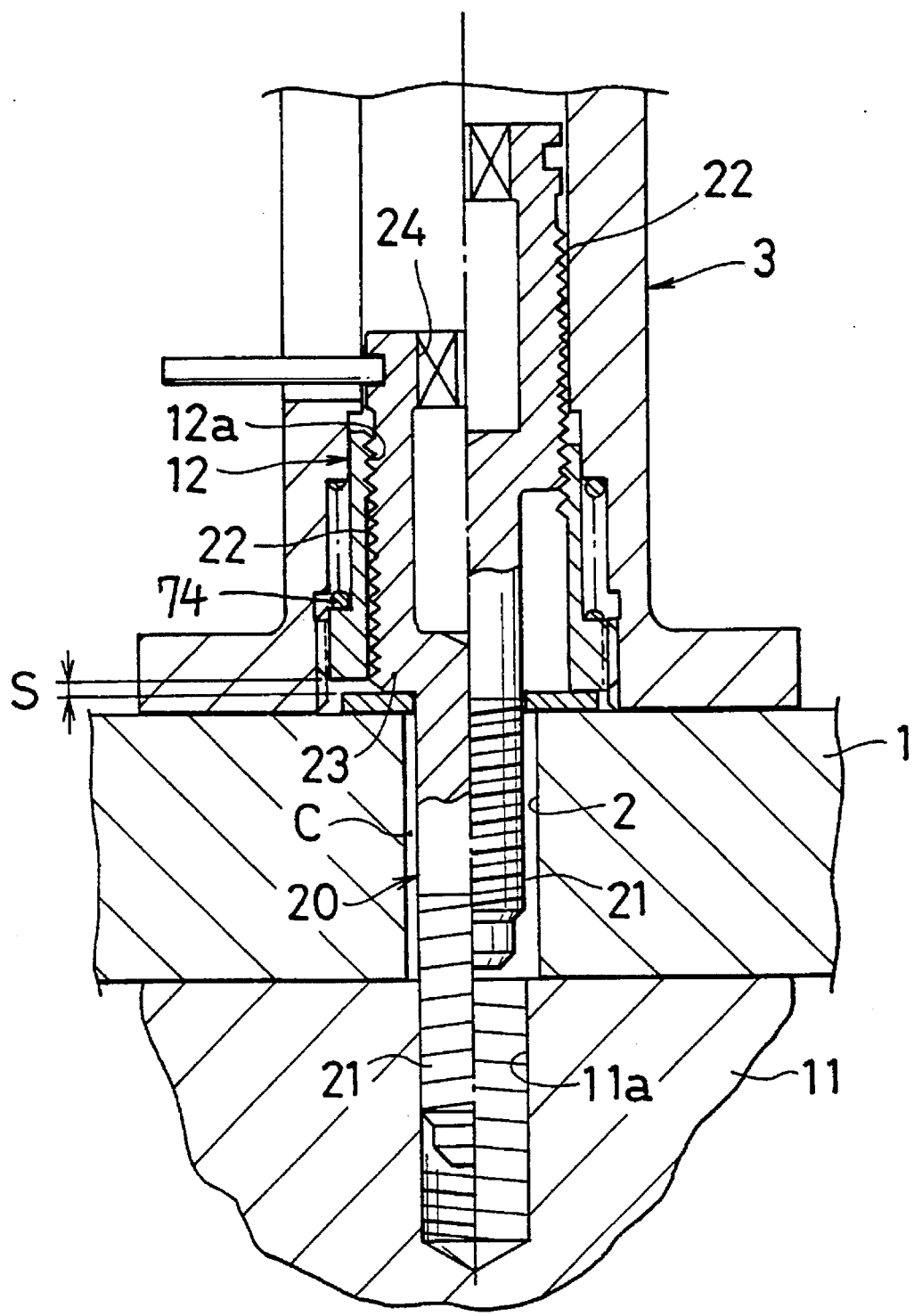
FIG. 15 shows a sixth embodiment of the present invention and is a view corresponding to FIG. 2.

FIG. 15 shows the sixth embodiment in which the fifth embodiment is modified as follows.

The first external thread 21 of the clamp rod 20 and the second external thread 22 are so formed as to have the same pitch, and the second external thread 22 is adapted to always engage with the second internally threaded member 12 from the unclamped condition as shown in the right half view to the clamped condition as shown in the left half view. In case that the pitches of the clamping internal thread 11a of the metal mold 11 and the first external thread 21 are out of phase at the time of commencement of the engagement therebetween, as shown in the left half view, a pitch offset between both these threads 11a, 21 can be corrected by a rising of the second internally threaded member 12 as far as the lift S against the spring 74.

Seventh Embodiment

Figure 16:
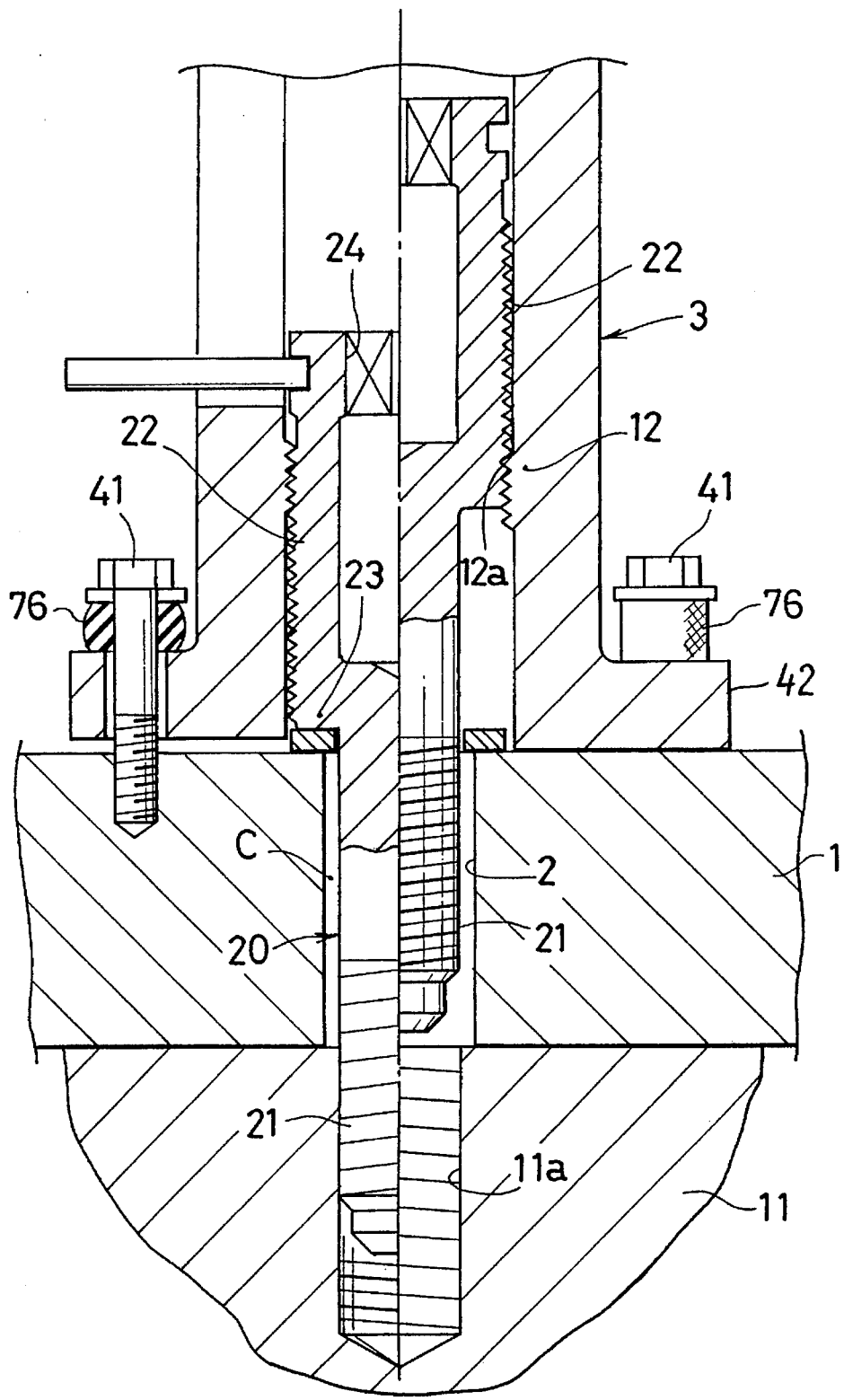
FIG. 16 shows a seventh embodiment of the present invention and is a view corresponding to FIG. 2.

FIG. 16 shows the seventh embodiment in which the sixth embodiment is modified as follows.

The second internally threaded member 12 is formed in the cylindrical bore of the housing 3. The flange 42 of the housing 3 is supported by the base 1 through the plurality of bolts 41 and the support rubbers 76. Therefore, in case that the clamping internal thread 11a of the metal mold 11 and the external thread 21 of the rod 20 are offset in axis or in pitch at the time of commencement of the engagement therebetween, as shown in the left half view, the whole of the housing 3 shifts to absorb the axis offset or the pitch offset.

The above-mentioned embodiments may be modified as follows.

Instead of the pneumatic impact wrench, a hydraulic impulse type impact wrench, an electric motor type impact wrench, a pneumatic motor, a hydraulic motor and an electric motor may be used as the rotating means.

The housing 3 may be omitted. In this case, the component members of the clamping apparatus may be directly mounted to the base 1.

Instead that the base 1 is used as the fixture side and the first internal thread 11 is used as the side to be fixed, the first internally threaded member may be used as the fixture side and the base may be used as the side to be fixed.

As many different embodiments of the invention will be obvious to those skilled in the art, some of which have been disclosed or referred to herein, it is to be understood that such embodiments change, or modifications may be made without departing from the spirit and scope of the invention as set forth in the claims appended hereto.

What is claimed is:

1. A clamping apparatus comprising:

a base (1) provided with a through hole (2) having a first end and a second end;

a first internally threaded member (11) arranged to face the first end of the through hole (2);

a second internally threaded member (12) supported by the base (1) adjacent the second end of the through hole (2);

a clamp rod (20) inserted into the through hole (2);

an alignment clearance (C) provided between the through hole (2) and the clamp rod (20);

the clamp rod (20) being provided with a first external thread (21) adapted to engage with the first internally threaded member (11), a second external thread (22) adapted to engage with the second internally threaded member (12), a pressing portion (23) adapted to press the base (1) from the second end of the through hole (2) and a rotating portion (24); and a rotating means (28) supported by the base (1) to rotate the rotating portion (24).

2. A clamping apparatus as set forth in claim 1, wherein the second internally threaded member (12) is resiliently supported by the base (1) so that when a screw thrust not less than a predetermined value is imposed from the second external thread (22) to the second internally threaded member (12), both the second external thread (22) and second internally threaded member (12) are disengageable from each other.

3. A clamping apparatus as set forth in claim 2, wherein there is provided a spring (13) for resiliently urging the second internally threaded member (12) radially inward.

4. A clamping apparatus as set forth in claim 2, wherein a transmission cylinder (31) having an aperture (33) is disposed between an output portion (30) of the rotating means (28) and the rotating portion (24) so that the rotating portion (24) is engaged by said aperture (33) of the transmission cylinder (31) so as to be rotated and to be vertically moved.

5. A clamping apparatus as set forth in claim 1, said first internally threaded member having a clamping internal thread (11a) having a minor diameter (D), and wherein a tapered lead portion (26) is provided at a leading end of the first external thread (21), and an outer diameter (d) of the lead portion (26) is set to a smaller value than the minor diameter (D) of the clamping internal thread (11a) of the first internally threaded member (11).

6. A clamping apparatus as set forth in claim 1, wherein a clamping housing (3) is mounted to the base (1) adjacent said second end of said through hole (2), the rotating means (28) and the second internally threaded member (12) being supported by the housing (3), a resilient member (4, 71, 76) being disposed at least either between the base (1) and the housing (3) or between the housing (3) and the rotating means (28).

7. A clamping apparatus as set forth in claim 2, said first internally threaded member having a clamping internal thread. (11e) having a minor diameter (D), and wherein a tapered lead portion (26) is provided at a leading end of the first external thread (21), and an outer diameter (d) of the lead portion (26) is set to a smaller value than the minor diameter (D) of the clamping internal thread (11a) of the first internally threaded member (11).

8. A clamping apparatus as set forth in claim 2, wherein a clamping housing (3) is mounted to the base (1) adjacent said second end of said through hole (2), the rotating means (28) and the second internally threaded member (12) being supported by the housing (3), a resilient member (4, 71, 76) being disposed at least either between the base (1) and the housing (3) or between the housing (3) and the rotating means (28).

* * * * *